(12) United States Patent
Rao (10) Patent No.: US 8,583,030 B2
(45) Date of Patent: Nov. 12, 2013

(54) MOBILE BASED LEARNING AND TESTING SYSTEM FOR AUTOMATED TEST ASSIGNMENT, AUTOMATED CLASS REGISTRATION AND CUSTOMIZED MATERIAL DELIVERY

(76) Inventor: Bindu Rama Rao, Laguna Niguel, CA (US)

(\*) Notice: Subject to any disclaimer, the term of this patent is extended or adjusted under 35 U.S.C. 154(b) by 386 days.

(21) Appl. No.: 13/025,601

(22) Filed: Feb. 11, 2011

(65) Prior Publication Data

US 2011/0130172 A1     Jun. 2, 2011

Related U.S. Application Data (63) Continuation-in-part of application No. 11/977,763, filed on Oct. 25, 2007, now Pat. No. 7,983,611, which is a continuation-in-part of application No. 11/821,771, filed on Jun. 25, 2007, now Pat. No. 8,135,331.

(60) Provisional application No. 60/860,700, filed on Nov. 22, 2006.

(51) Int. Cl.
  *H04H 60/09*     (2008.01)
(52) U.S. Cl.
  USPC ............... 455/3.04; 455/412.1; 455/414.1; 455/90.1; 434/322
(58) Field of Classification Search
  USPC .............. 455/3.04, 566, 2.01, 3.05, 466, 557, 455/411, 415, 414.1, 456.2, 412.1, 412.2, 455/414.3, 435.1, 90.1; 434/322, 362, 327, 434/340, 341, 350; 715/758; 709/204, 218
  See application file for complete search history.

(56) References Cited

U.S. PATENT DOCUMENTS

| | | | | |
|---|---|---|---|---|
| 5,161,977 A | \* | 11/1992 | Thomas, Jr. | 434/322 |
| 2002/0013816 A1 | \* | 1/2002 | Hori | 709/204 |
| 2007/0269788 A1 | \* | 11/2007 | Flowers et al. | 434/350 |
| 2010/0288845 A1 | \* | 11/2010 | Akbar | 239/1 |
| 2010/0293478 A1 | \* | 11/2010 | Dahlgren | 715/758 |

\* cited by examiner

*Primary Examiner* — Tan Trinh (57) ABSTRACT

A mobile based learning and testing system comprising a mobile device for mobile based learning and testing, wherein the mobile device is communicatively coupled to a server that supports retrieving educational and instructional material and testing. The mobile device comprises a downloadable educational mobile app capable of presenting educational and instructional material retrieved from the server, facilitating group interactions, providing a mock test, conducting an actual test and arranging automatic registration of a user of the mobile device based on a test result from the actual test. The downloadable educational mobile app presents the educational and instructional material (retrieved from the server, or locally available in the mobile device where it is stored in storage components) to the user of the mobile device based at least on the user's membership in a group of users, the user's membership information being maintained by the server.

20 Claims, 4 Drawing Sheets

MOBILE BASED LEARNING AND TESTING SYSTEM FOR AUTOMATED TEST ASSIGNMENT, AUTOMATED CLASS REGISTRATION AND CUSTOMIZED MATERIAL DELIVERY

CROSS REFERENCES TO RELATED APPLICATIONS

The present patent application is a continuation-in-part of, claims priority to, and makes reference to U.S. non-provisional patent Ser. No. 11/977,763, entitled "MOBILE DEVICE THAT PRESENTS INTERACTIVE MEDIA AND PROCESSES USER RESPONSE", filed on Oct. 25, 2007, now U.S. Pat. No. 7,983,611. The complete subject matter of the above-referenced United States Patent Application is hereby incorporated herein by reference, in its entirety.

The non-provisional application Ser. No. 11/977,763 is itself a continuation-in-part of, claims priority to, and makes reference to U.S. non-provisional patent Ser. No. 11/821,771, entitled "SYSTEM FOR PROVIDING INTERACTIVE USER INTEREST SURVEY TO USER OF MOBILE DEVICE", filed on Jun. 25, 2007, now U.S. Pat No. 8,135,331. The complete subject matter of the above-referenced United States Patent Application is hereby incorporated herein by reference, in its entirety.

This patent application makes reference to U.S. provisional patent Ser. No. 60/860,700, entitled "AUDIO GUIDED SYSTEM FOR PROVIDING GUIDANCE TO USER OF MOBILE DEVICE ON MULTI-STEP ACTIVITIES", filed on Nov. 22, 2006. The complete subject matter of the above-referenced United States Patent Application is hereby incorporated herein by reference, in its entirety.

This patent application makes reference to U.S. Provisional patent application Ser. No. 60/524,568, entitled "QUESTIONNAIRE NETWORK FOR MOBILE HANDSETS," filed on Nov. 24, 2003. The complete subject matter of the above-referenced United States Provisional Patent Application is hereby incorporated herein by reference, in its entirety.

This patent application makes reference to U.S. patent application Ser. No. 10/985,702, entitled "QUESTIONNAIRE NETWORK FOR MOBILE HANDSETS," filed on Nov. 10, 2004. The complete subject matter of the above-referenced United States Patent Application is hereby incorporated herein by reference, in its entirety.

This patent application makes reference to U.S. Provisional patent application Ser. No. 60/530,175, entitled "QUESTIONNAIRE NETWORK FOR MOBILE HANDSETS AND A TRADING SYSTEM FOR CONTRACTS ON USER COMMITMENTS TO ANSWER QUESTIONNAIRES," filed on Dec. 17, 2003. The complete subject matter of the above-referenced United States Provisional Patent Application is hereby incorporated herein by reference, in its entirety.

BACKGROUND

1. Technical Field

The present invention relates generally to educational services, and specifically to the teaching and testing using technology.

2. Related Art

In the last decade, a lot of technical developments have made communication easy and widely available. Education of children has not caught up with changes in lifestyles. Educational services have not adapted adequately to employ new tools and technologies that can deliver more effective education. For example, mobile phones of all kinds have proliferated all over the world. Some of them are small tiny cellular phones, others are more powerful and flexible smart-phones, some are small electronic tablets and tiny netbooks, etc. All of these are very convenient to use. But our schools not only ban the use of mobile devices during school hours but also do not encourage their use for educational needs. In fact, schools in general are not equipped to employ newer technologies that can make learning interesting and easy.

Some schools have computer labs where students watch a demonstration of an experiment. Some schools allow their users to browse the web for information. Some educational websites have put up books online that a user can browse. Most of these websites are good at providing some sections of a book for perusal by a user using a browser. However, children need to be able to get to a computer/laptop to access these sites—not many students have access to computers in this world. In addition to computers/laptops, a student needs broadband connections to browse these content rich websites.

A number of high school children every year take standardized tests such SAT and ACT exams, and many of them attend SAT and ACT preparatory classes. These classes are fast paced and useful. However these classes require a student to physically attend these sessions, and they add to the educational burden of these students and eat into their time for studies. Often students purchase test practice work books and use them to get acclimatized to the test situations. These work books are big fat heavy books and are quite inconvenient to carry and daunting to a student. These books often put-off a an aspiring student.

The Internet is a very powerful communication means and quite often, the mobile devices available in the world can employ the Internet for communication. Most of them also employ the telecom networks (such as cellular networks) for communication. Some of the mobile devices can use both the Internet as well as the telecom networks for communications.

People using mobile devices such as mobile phones often find a camera embedded in the mobile phones and take pictures. Some of them are also capable of emailing these pictures to friends. Of late, some mobile devices have become capable of displaying digital videos and movies. Some of them are also able to capture small digital video clips. Various mobile applications have been created and the demand for them is increasing. Mobile phone users, for example, can download thousands of mobile apps and often clutter up their mobile phones. However, there are very no mobile apps that address educational services. Similarly, there are no mobile apps that address testing services.

These is a need to make mobile applications for education. There is a need to make such mobile applications address the need of students to communicate with each other and with instructors. There are no easy solutions available to solve this problem.

In general, creation of a new mobile application takes a lot of time, energy and resources. It takes a team well versed in software development and testing. It takes a team that has access to and mastery of new technology. It takes PCs, servers, code management systems, simulators integrated development environments (IDE), etc. Thus, only a few large corporations have the people and resources to develop mobile apps for their use. And these corporations have not created any useful mobile app that addresses teaching needs, testing needs, registration needs, user interaction needs, automated remedial coursework determination, etc.

Students often take tests and do not know how they have performed on the test, or in which areas they need to improve.

Quite often, it is difficult for a student to determine how he can improve his test score. The student may know that he is weak in some subject, but not know what to do with it or how to improve his skills. The student often does not have access to information that can help him do better in his tests if he retakes that test. The student is left to fend for himself, and any study material or study guides he might need may not be easily available in the stores or even at school.

In view of the foregoing considerations, it is clear that there is a need for a mobile based learning and testing system that provides automated test assignment, automated class registrations and customized material delivery.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

The present invention provides a system for mobile based learning and testing that makes it possible for a user of a mobile device to take online courses on his mobile device, take tests on his mobile device, receive test results and remedial courses on the mobile device, etc.

Figure 1:
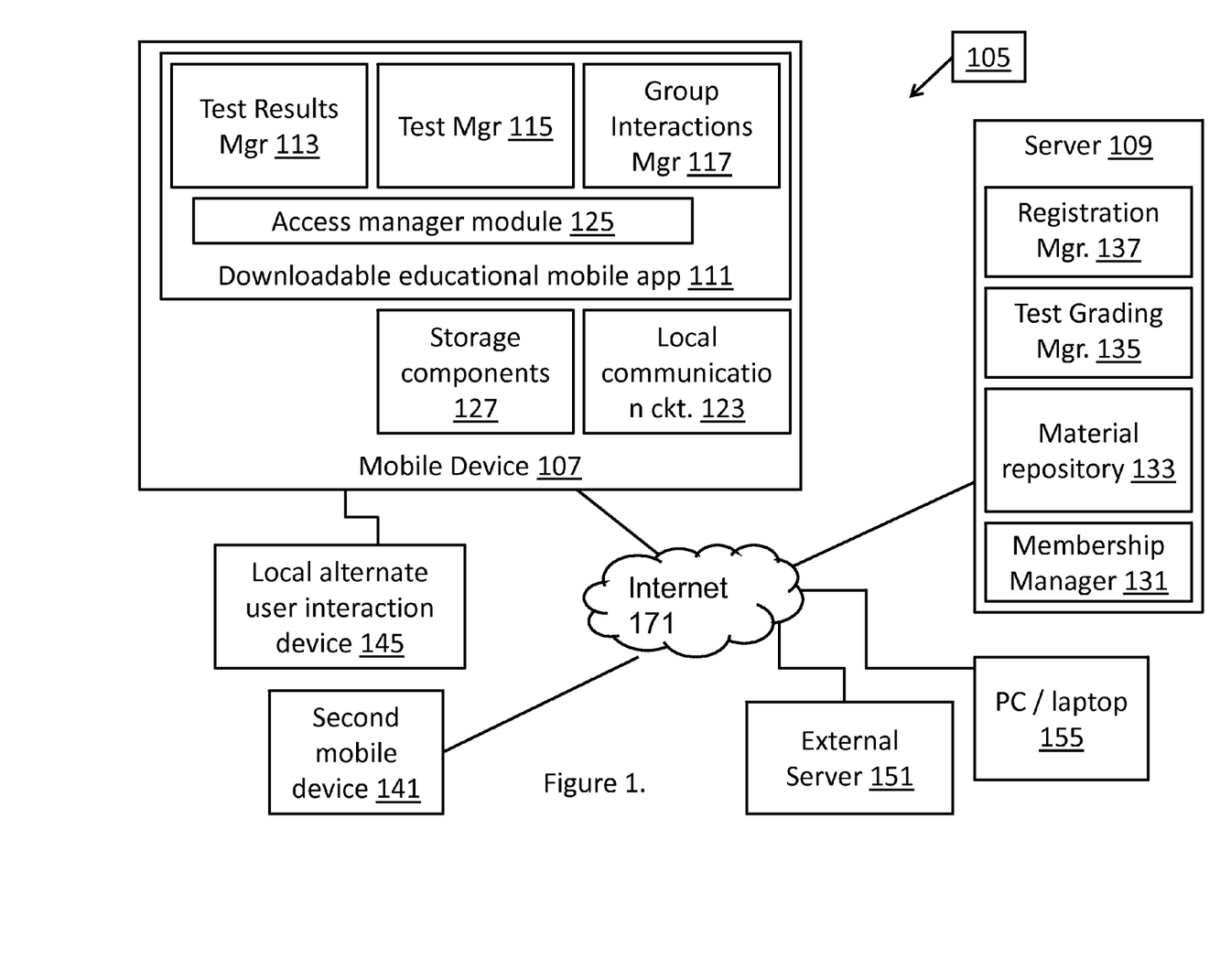
FIG. 1 is a perspective block diagram of a mobile based learning and testing system.

FIG. 1 is a perspective block diagram of a mobile based learning and testing system 105. It comprises a mobile device 107 for mobile based learning and testing, wherein the mobile device 107 is communicatively coupled to a server 109. The mobile device 107 comprises a downloadable educational mobile app 111 capable of presenting educational and instructional material retrieved from the server 109, facilitating group interactions, providing a mock test, conducting an actual test and arranging automatic registration of a user of the mobile device based on a test result from the actual test. The downloadable educational mobile app presents the educational and instructional material (retrieved from the server 109, or locally available in the mobile device 107 where it is stored in storage components 127) to the user of the mobile device 107 based at least on the user's membership in a group of users, the user's membership information being maintained by the server 109. The user is typically a member of one or more user groups, and can participate in group activities from his mobile device 107. The downloadable educational mobile app 111 facilitates group interaction by the user with other members of the group of users. It provides a mock test to the user based at least on a user request or a user specific schedule. A user might want to prepare for a standardized test (such as a SAT or ACT exam) and might schedule mock tests as part of SAT preparation.

The present invention provides the system 105 for mobile based learning and testing that provides automated test assignment, automated class registrations and customized material delivery. Specifically, based on a user profile (such as a profile that indicates that the student is in the $11^{th}$ grade, or that the student is 16 and yet to get a driver's license) and user goals and preferences, the system automated class registrations, such as a registration for a SAT preparatory class, a beginner driver's training class, a advanced placement (AP) course training, etc. It also assigns tests to the user, such as a SAT mock test, a mock test of a drivers education exam, a AP chemistry mock test, etc. The system built in accordance with the present invention also provides customized material for self-paced study by the user, wherein the customized material is delivered to the user in several forms, such as a mobile version of the customized material delivered to the user's mobile phone as desired I (and as necessary) by the user, an ebook version delivered to the user's mobile and his email address, a physical book(s) delivered to the user's residence, etc. The user profile and membership information is typically stored at the server 109 (and in the mobile device 107 too optionally).

The downloadable educational mobile app 111 of the mobile device 107 comprises a group interactions manager 117 that facilitates interactions with one or more people in a group (of which the user is a member), a test manager 115 that facilitates taking tests, and a test results manager 113 that facilitates retrieval, local storage and display of test results for the user. It also comprises the access manager module 125 that provides access to education and test material available in the material repository 133 of the server 109 in addition to various features provided by the downloadable educational mobile app 111 and the server 109. It implements security features and subscription management features.

The server 109 comprises a membership manager 131 that facilitates creation of user groups, managing user groups, subscription management and user preferences management. The server 109 comprises a material repository 133 that stores the educational and instructional material, tests, mock tests, reference material for various courses, tutorials, etc. that the mobile device 107 can retrieve. It also comprises a test grading manager 135 responsible for receiving user inputs to tests (termed test response sometimes) and creating test results that are communicated to the user via the downloadable educational mobile app 111 in the mobile device 107. The server 109 also comprises a registration manager 137 that is used to automatically register selected users for one or more tests and remedial coursework based (at least in part) on their performance on tests and their goals. For example, based on test results for a user of the mobile device 107, the registration manager 137 automatically registers that user to remedial coursework, sends remedial material from the material repository 133 to the downloadable educational mobile app 111 (where it is stored and shown to the user, as required), registers the user to follow-up activities, such as a follow-up mock test, a tutorial, and a follow-up actual test (repeat of the previous test taken for which the test result had been created).

The downloadable educational mobile app 111 conducts an actual test (with the help of the test manager 115, for example) for the user on the mobile device 107 and collects a test response set from the user in the process. The test results manager 113 presents a test result to the user, wherein the test result is provided based on the actual test taken by the user and the test response set. For example, the downloadable educational mobile app 111 sends the test response set collected from the user to the server 109 and obtains a test result that is presents (with the help of the test results manager 113 for example) to the user of the mobile device 107. In general, the downloadable educational mobile app 111 receives, displays to the user of the mobile device 107, and saves a test completion certificate that it receives from the server 109 (or from an external server 151). The test completion certificate comprises a date, a reference to the actual test and the test result. The downloadable educational mobile app 111 automatically registers the user (who has taken a test on the mobile device 107) with the server 109 for other follow-up activities based on at least the test result.

The downloadable educational mobile app 111 of the mobile device 107 facilitates user interaction with the follow-up activities that are provided to a user after the user takes a test. The follow-up activities is one or more of the activities from the set comprising result review and display, automatically scheduling follow-up test, automatically administering a follow-up test, automatically delivering remedial study material, automatically mailing an appointment, automatically delivering ebooks, automatically delivering documents, articles and papers and automatically facilitating retaking of the test. Other types of follow-up activities, such as retaking the test right away, sending the test results to an educational institution, etc. are also contemplated.

The downloadable educational mobile app 111 of the mobile device 107 conducts the follow-up test for the user, wherein the follow-up test is one test from the set comprising a more advanced test, a less advanced test, a repeat test, a complimentary test, a comprehensive breadth coverage test and a narrow expertise test. Thus, if the user takes a test and finds it to be very easy, and does well on the test, the user automatically is prompted to take a tougher test, one that truly measures his capability better, one this is more challenging than the first test in some ways. Similarly, if the user takes the test and finds it to be very difficult, and does not do well on the test, the user automatically is prompted to take an easier test, one that provides the user an easier test that the user is likely to do well on.

In one embodiment, the downloadable educational mobile app 111 in the mobile device 107 facilitates conducting the actual test by displaying portions of the actual test on the mobile device 107 while soliciting the test response set from the user. It collects the test response set from the user and sends it to a second mobile device 141 associated with a second user for grading. The downloadable educational mobile app 111 in the mobile device 107 receives a test result from the second mobile device 141, based upon a grading operation executed by the second user on the second mobile device 141. The downloadable educational mobile app 111 in the mobile device 107 presents the test result received to the user. In a related embodiment, the second mobile device 141 also comprises the downloadable educational mobile app 111 which the user of the second mobile device 141 employs to review the test response from the mobile device 107 and to create the test results. Thus, an authorized expert (or a teacher of a online course, etc.) associated with a test receives a test response from the mobile device 107 on his second mobile device 141, reviews that test response received (with the help of the downloadable educational mobile app 111 in the second mobile device 141) and creates a test result that is returned to the downloadable educational mobile app 111 of the mobile device 107 (and also stored in the server 109). In one embodiment, the authorized expert is a manager of a group (such as all the registered students of an online mobile class) in which the user of the mobile device 107 is a member.

The downloadable educational mobile app 111 provides preparatory material to the user, prior to the actual test, wherein the preparatory material comprises references to at least one of a relevant document, a relevant book, a specific relevant section in a book, a study guide, a tutorial, a cheat sheet, an example problem with an associated answer to the problem. The test result is computed by the test grading manager 135 of the server 109 based on the test response set received from the downloadable educational mobile app 111. The downloadable educational mobile app 111 provides a question with at least one image as part of the actual test. The downloadable educational mobile app 111 facilitates the making of a mark on the image displayed by the user. It processes the mark provided by the user and selectively communicates it to the server 109 along with test response set provided by the user for the test. The mark made by the user comprises a point selected by the user on the image(s) displayed or a set of points selected by the user on at least one image in a set of images displayed to the user.

In administering tests on the mobile device 107, the user is presented with several questions, often one question at a time on a separate panel (although multiple questions on a screen or panel are also provided, optionally), with an audio preamble asking the question, a textual prompt and an image accompanying the question. Some questions require the user to select and highlight one or more points on the image presented, and the downloadable educational mobile app 111 facilitates selection by the user of these one or more points on the displayed image it also captures coordinates or other information related to the user selection of points. A visual indication is provided on the image where the user has made his selections (such as a 'X' mark', a dot, etc.). For example, an image of the human anatomy is presented in a question of a test and the user is asked to point to the heart. The downloadable educational mobile app 111 facilitates selection and high-lighting of a section of the displayed image (by a user) employing a stylus, a finger touch (on a touch sensitive screen, for example), a joystick based selection, etc. Similarly, a user can be asked to point to a location on a topographical map and user input (selections on the map) is recorded by the downloadable educational mobile app 111.

In one embodiment, the downloadable educational mobile app 111 also interacts with a local communication circuitry 123 to communicate with a local alternate user interaction device 145, wherein the local alternate user interaction device is one of a TV, a set-top-box, a router, a dock with display and keyboard and a personal computer. The downloadable educational mobile app 111 communicates a current question for display on the local alternate user interaction device 145. It receives user inputs for the current question (and for subsequent questions too, as the user provides them) and stores it for processing and subsequent communication to the server 109. The downloadable educational mobile app 111 causes the display of the questions of the questionnaire, audio guided activities for training a student, tutorials, practice exercises, etc.—collectively referred to as interactive media sometimes, on the local alternate user interaction device 145. Thus interactive media, in one embodiment, is one or more of mock tests, the actual test; the test result and follow-up activities, for example. The downloadable educational mobile app 111 collects, stores and communicates to the server 109 or to an external server 151 user inputs (sometimes referred to as an external device user inputs) provided by the user employing the local alternate user interaction device 145.

The downloadable educational mobile app 111 is able to manage the display of certain types of interactive media on the other local devices (in vicinity, for example) such as a TV, a DVD player, a stereo system, which are generically referred to as local alternate user interaction device 145. Even a user's a PC/laptop 155, may be used to display certain types of content to the user as part of a coursework, tutorial, lesson, training or test. Managing and configuring the flow of appropriate type of training material or content to the local alternate user interaction device 145 is the responsibility of the downloadable educational mobile app 111 and the server 109. For some types of content within a specific test (or training material in a training session), such as a training video in high definition, the downloadable educational mobile app 111 employs a high definition TV in its vicinity (one that it discovers or one that the user configures) for display by user, while it coordinates delivery of such content to that high definition TV. Within the same test, other types of content, such as multiple choice questions, are displayed to the user on the mobile device 107 by the downloadable educational mobile app 111. A high definition MPEG-4 movie of a training video, that is in large format (which is overkill in the case of a small mobile device 107), the downloadable educational mobile app 111 advises the user to configure a PC/laptop, a gaming console (connected to a big HD TV for example), a router connected to a PC/laptop, or a set-top-box (connected to a TV) to receive that high definition MPEG-4 movie. An accompanying multiple choice question component is simultaneously received and presented to the user by the downloadable educational mobile app 111.

The access manager module 125 facilitates access of the local alternate user interaction device 145, as necessary, and it also helps configure such devices, and communication means to access them from the server 109 (or the external server 151, as necessary.

In one embodiment, the downloadable educational mobile app 111, with the help of the test manager 115, administers a first test to a user, automatically processes a user data provided by the user in response to the first test to compute a first test results (employing the test results manager 113). It then automatically determines remedial activities that need to be provided to the user based on the first test results. It presents a custom user material associated with the remedial activities to the user on the mobile device 107. The custom user material is retrieved from the material repository 133 of the server 109. It can also retrieve such custom user material from an external system 151 communicatively coupled to the mobile device 107 or the server 109. In one embodiment, the server 109 determines what needs to be included in the custom user material, employing user preferences available in the membership manager 131, user registration information available in the registration manager 137, test results from test taken by the user, user test goals expressed by the user in registration information available via the registration manager 137, etc. In another, the downloadable educational mobile app 111 determines what needs to be included in the custom user material.

In general, the downloadable educational mobile app 111 administers the remedial activities for the user on the mobile device 107 wherein the remedial activities comprise undertaking a set of remedial online classes, viewing a tutorial session, reviewing a portion of an ebook for study, reading a personalized teaching material, working through workbook exercises, viewing a video demonstration, and taking a subsequent mock test. The remedial activities are determined by the server 109 in one embodiment and by the downloadable educational mobile app 111 in another. In a different embodiment, the remedial activities are determined by a teacher of a course or an expert (such as a counselor) via the second mobile device 141 or via the PC/laptop 155 communicatively coupled to the server 155 via Internet 171.

The mobile device 107 and the server 109 are communicatively coupled over Internet 171 typically although a private network, a cellular network, a dedicated network, a local area network, a wide area network, a satellite network and a broadband network are also contemplated. The mobile device 107 and the local alternative user interaction device 145 communicate over WiFi (802.11 variants) or bluetooth. Other forms of local communication, such as InfraRed (IR), firewire, serial line communications, HDMI, WiMAX and cellular are also contemplated.

In general, the downloadable educational mobile app 111 facilitates collection of a test response set from the user, wherein the test response set comprises user answers to a plurality of questions of the actual test (or a mock test) presented to the user. The user's answers are provided by the user employing a recorded audio format, a textual data entry format, a digital image format or a combination of these formats. Thus, an answer to one question in the actual test can require the user to input text and the user's text input is noted (and processed/saved as necessary), the answer to a second question may require the user to record his answer providing an audio input, and the downloadable educational mobile app 111 facilitates recording of audio by the user. Similarly, taking a digital photo (to create a digital image input) is also facilitated. In addition, the user can mark one or more sections (to highlight them) of the digital photo taken by him as part of an answer to a question. The downloadable educational mobile app 111 communicates the test response to the server 111. The test response often is a complete collection of all the answers to all the questions of a test (although sending of partial collections are also supported), including all the text inputs, audio inputs or references thereof, digital photos provided or references thereof, etc. It is sent to the server 109 for storage, automated analysis and the determination of follow-up activities, for example.

In general, the downloadable educational mobile app 111 automatically highlights the relevant sections in at least one associated ebook that is relevant for a test, such as a recommended physics text book for a physics test. Typically, such ebooks, papers, documents and reference materials in general are provided by the server, or known to the server. These reference material are what the user is expected to study as part of the preparation for a test that is to be administered. For example, if a first test is taken by a user on his mobile device 107, wherein the test manager 115 of the downloadable educational mobile app 111 facilitates taking of the test by the user, the reference material is made available to the user by the downloadable educational mobile app 111. A reference material is where the user can find the relevant answers to one or more questions included in the first test taken by the user. After the first test is taken by a user, administered by the downloadable educational mobile app 111, the test results are provided, and, in addition, with the help of the test results manager 113, relevant sections (pages, paragraphs, lines) are highlighted (each with a different color code—pages green, paragraphs yellow, lines in red, for example) in the reference material to help the user determine where he went wrong (or where he was right), and what answers had been expected. The downloadable educational mobile app 111 highlights sections (pages, paragraphs, lines etc). where the answers to any question in a given test can be found. For example, for a given test the scope of which is covered by an ebook that is recommended for that test, the downloadable educational mobile app 111 highlights sections (pages, paragraphs, line numbers, etc.) that are relevant for each question, or sections that contain the answers or a solution to each question in the test. The ebook is currently available in the mobile device 107 or automatically delivered to the mobile device 107 from the server 109 based on the first test results. In general, the test results manager 113 keeps tracks of test results and reference material for those tests and is able to map questions on a test with the relevant sections where corresponding answers can be found in the reference materials (such as ebooks, websites, articles, documents, spreadsheets, tables, etc.).

In particular, the downloadable educational mobile app 111 makes it possible to highlight sections of a reference material (ebook, paper, document, etc.) that contain answers to questions that the user had not answered or had answered wrong on the test. Such relevant sections that are highlighted often correspond to a question in the first test that the user failed to answer adequately. By providing such feedback to a user, the downloadable educational mobile app 111 makes it possible for a user to review his mistakes and get the answers right the next time he takes the test (same one or a different one).

In one embodiment, the downloadable educational mobile app 111 in the mobile device 107 receives a notification from the server 109, wherein the notification comprises one of a reference and a link to a test that has been scheduled or a lesson to be reviewed by the user. In response, the downloadable educational mobile app 111 retrieves the test that has been scheduled or the lesson to be reviewed from the server 111, processes it, automatically displays it to the user, and monitors user response. While taking the test, the user can enter data in input fields (such as text entry boxes), make selection on multiple choice prompts (inclusive or exclusive set of multiple choices are displayed), provide audio recording, provide digital photo images, record video, and send them to the server 109 for storage or processing (or even the external server 151).

In general, the user takes a test on the mobile device 107 (or on website associated with the server 109, alternately), and, based on the results of that test, the user is automatically assigned a different test to take (or a test is scheduled for him automatically by the server 109 based on user goals, user preferences, test results for prior tests, etc.). For example, if the user does well (scores above a threshold, or scores well in some areas of the test and not well in others areas of a test) in some areas of a test, then the subsequent test may be assigned to test him further on the areas where the user did well on a prior test. Alternately, the subsequent test may be assigned to test him further on the areas where the user did not do so well (based on parameters and thresholds set for that user, or based on default thresholds—such thresholds configured on the server 109).

In addition to assigning a subsequent test selectively, to a user, the system 105 automatically assigns further study guides, additional lessons, guided activities, class schedules, automatic registration into one or more classes, and/or remedial course registrations.

In one embodiment, the system delivers a certificate to the user on his mobile device 107 and on his registered email account (known to the server 109), wherein the certificate certifies that the user took that test, and it optionally also provides a transcript (of scores) for the test(s) taken by that user in a certain time frame. In a related embodiment, the system delivers books to the user based on the test results. It also enables sharing of the test results with other users or with external servers. For example the external server 151 may be associated with a department of motor vehicles, or with an educational institution, or with a business organization.

The user can share the results of the tests taken by him with the whole group in which he is a member. The user of the system 105 can also take the test partially on a PC/laptop 155, and partially on the mobile device 107 of the user, such as a PDA, or on other devices in proximity to the mobile device 107, to which the user has access, such as a cellular mobile phone, a tablet, etc.

During the administration of a test by the downloadable educational mobile app 111, the user can selectively access (from the server 151 for example) and play instructional material that will enhance his comprehensions of the subject matter, the questions being asked on the test, or on the test taking methods and techniques involved.

The system 105 makes it possible for a user to take tests that are a "pre-requirement" for a class at an educational institution. It provides reading material (preparatory material in general) to the user, prior to the test, and it provides references to specific books, chapters in a book, sections of chapters, that the user is likely to be tested on. In addition, after taking the test, the system highlights the sections in books, chapters and sections of books where the user can find the relevant answers to the questions in a test, and it also marks appropriate sections of a book or document for questions where the user (test taker) committed a mistake on the text (or got the answer wrong).

The system 105 provides images (for maps of topography, blue prints, or human body, for example) that a user can make browse, and make marks on (such as by selecting a point on that image, or marking one or more points on the image with an "x" cross mark). For example, using a stylus, or a touch sensitive user interface, the user can mark points/items on an image displayed. Other means are also contemplated, such as use of a joystick and buttons.

The system 105 facilitates automatic delivery of books (ebooks or physical printed books), reading material, instructional material, etc. to the user based on the test results of a test taken by the user on the mobile device (or alternately, on the PC/laptop, or a combination thereof). Such delivery is coordinated/managed by the server 109 based on registration of the user to various courses, tutorials and tests (registration being managed by the registration manager 137).

The system 105 serves as a mobile based learning and testing solution for children (school age children for example) wherein children can learn using audio guided activities, ebooks provided to them, tests administered to them, and by remedial instructions provided to them following those tests. In addition, a schedule of instructions and tests is created for a student automatically, as required, based on their age, preferences and performance on previous test (and other related information). Prior to the taking of a test, the user if provided mock tests typically.

In general, children are grouped into interaction groups, and they can interact with each other, share assignments completed, share data collected, etc. Students can collaboratively complete assignments. The collaboration on projects is managed by the membership manager 131 on the server 109 side and by the individual downloadable educational mobile app 111 on the mobile devices (such as 107, 141) of the corresponding users. In one embodiment, children participating on a collaborative project can make observations that are stored and shared with the groups, wherein the individual observations are each in the form of recorded audio, digital photos and textual inputs. A completed project is generated by the server 109 when requested by any user of the collaborative project group (formation of such a group is managed by the membership manager 131). In addition, a completed project report can be sent for grading by a teacher or advisor, wherein the test grading manager 135 facilitates grading by a teacher or advisor associated with that collaborative project group.

In general, the server 109 stores a plurality of educational materials (lessons, course works, tests, mock tests, practice exercises, tutorials, etc.) managed by the material repository 133. Each of the plurality of educational materials being used for a different need by a user of the mobile device 109. An educational materials upload module (not shown) in the server 109 is used to upload new educational materials by a manager or privileged user. Additionally, educational materials upload may require the use of the PC/laptop 155 or the external server 151. The server 109 then processes these educational materials upload and creates storage components in the material repository 133, as appropriate, and also creates tables and related data (such as configuration, preferences, control blocks, etc.) in the database associated.

The downloadable education mobile app 107 in the mobile device 107 presents each of the plurality of education material when requested by a user from a mobile device 107, or when they are pushed/delivered by the server 109, as required.

For example, in one embodiment targeted towards high school students, where students taking a SAT exam can be registered, the downloadable education mobile app 107 requires the user to be in a group where the entire group takes a same training course, share the same/similar training material, and mock tests. The server 109 prompts the user for his agent id and password during a login and then allows the user of the mobile device 107 to access training materials, mock tests etc. as per a user-specific schedule, and also in an adhoc manner. The server 109 also, based on the user needs and preferences and a schedule created with the consent of the user, provides training material and tutorials. It also creates an appropriate user profile and maintains it over the duration of user involvement. The users can share their test results with each other, share questions, seek clarifications from each other and from their instructors/teachers in the group, etc.

In one embodiment, the server 109 stores a plurality coursework for a plurality of certifications, wherein the coursework are organized by certifications for which they are relevant. When a user registers for a certification, that user gets a downloadable educational mobile app 111 for his mobile device 107. Then the server 109 lets the user get test materials, training materials, tutorials, notification for online classes, etc. whenever the user wants them, at his convenience. The server 109 also creates a schedule of activities for that user and communicates it to the downloadable educational mobile app 111 in the mobile device 107. The downloadable educational mobile app 111, based on that schedule, alerts the user, retrieves relevant documents/tests/etc. for the user to review or practice, and then displays them to the user. In the case of mock tests, it sends the collected user responses to the server for grading and the retrieval of test results.

The server 109 presents to the mobile device 107 an appropriate one of the plurality of educational materials when requested by a user. For example, when the user, using the downloadable educational mobile app 111 of the mobile device 107, selects one reading material, such as an ebook, from a list of available ebook presented to the user, the appropriate/associated ebook is given by the server 109 to the downloadable educational mobile app 111 of the mobile device 107, which then processes it, and displays a set of screens based on the display needs of the ebook. Similarly, if a notification is sent from the server 111 to the downloadable educational mobile app 111 of the mobile device 107, the downloadable educational mobile app 111 wakes up (typically having waited for the notification, for example, by waiting on a port) and processes a reference/link to the associated ebook or reading material, and the downloadable educational mobile app 111 retrieves it from the server 109 and then presents them to the user via screens on the mobile device 107.

Figure 2:
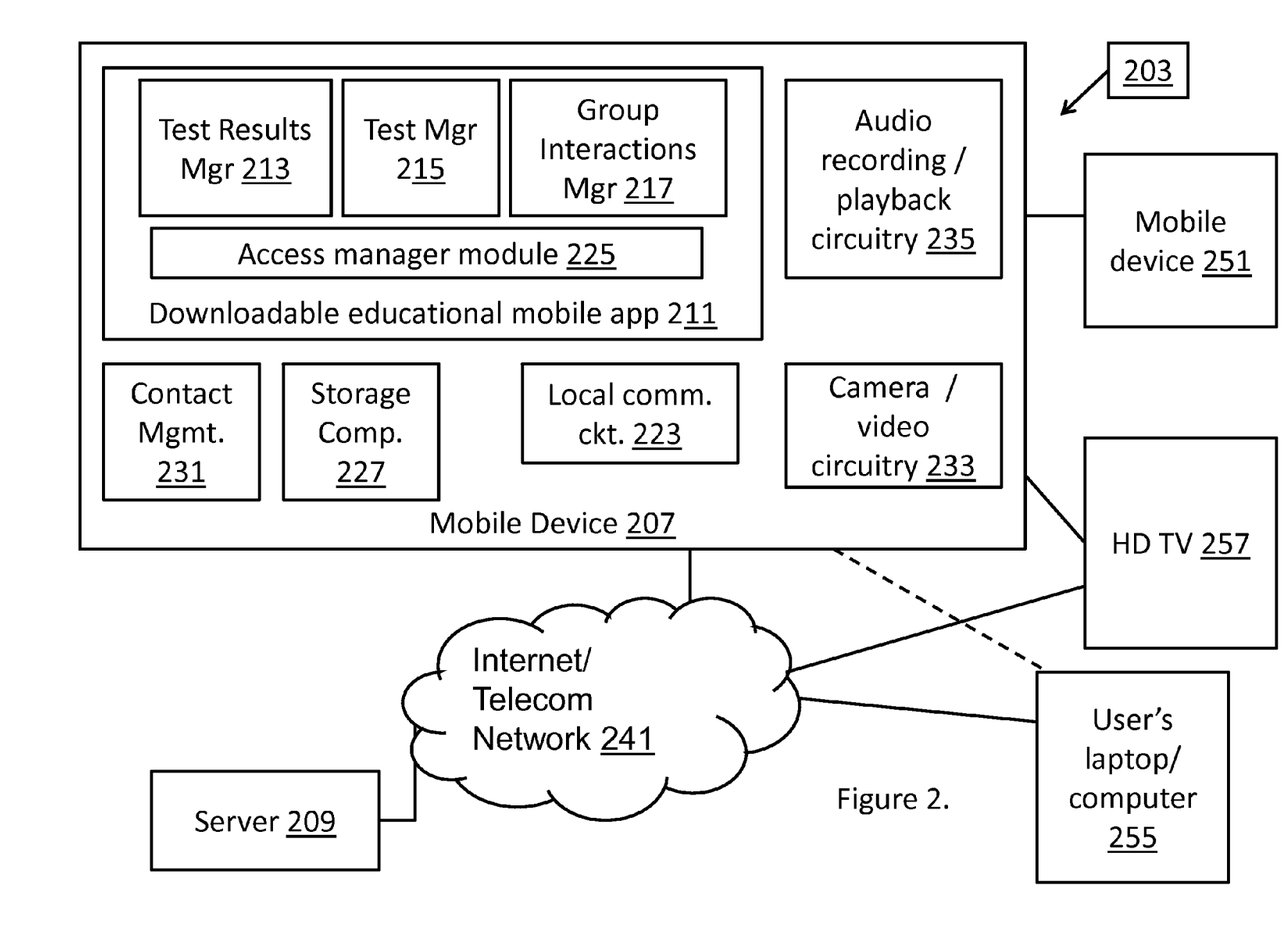
FIG. 2 is a perspective block diagram of a mobile based system for learning and testing wherein downloadable educational mobile app in a mobile device manages educational content retrieval such that the user is able to view portions of the content on an HDTV, a user's laptop/computer and a second mobile device based upon the type of content being retrieved and based upon user preferences and device capabilities.

FIG. 2 is a perspective block diagram of a mobile based system for learning and testing wherein downloadable educational mobile app 211 in a mobile device 207 manages educational content retrieval such that the user is able to view portions of the content on an HDTV 257, a user's laptop/computer 255 and a second mobile device 251 based upon the type of content being retrieved and based upon user preferences and device capabilities. The mobile device 207 comprises a local communication circuitry that is uses to communicate selectively with the HDTV 257, the user's laptop/computer 255, and other local devices that can be used by the mobile device 207 to display specific types of content that are not compatible with or not adequately supported by the mobile device 207. This ensures better user experience by employing appropriate devices in close proximity to the mobile device 207 providing for better user experience and better user interaction.

In one embodiment, the downloadable educational mobile app 211 of the mobile device 207 receives a test for a user, wherein the test comprises a video section that the downloadable educational mobile app 211 displays on the HD TV 257 while displaying a multiple choice component of the questions of the test on the mobile device 207 that solicits user inputs and user interactions (in addition to those interactions solicited on the HDTV 257). In a related embodiment, a user can complete a first portion of a lesson (for an online course for example) on the mobile device 207 employing the downloadable educational mobile app 211 while completing a second portion on the user's laptop/computer 255 (employing webpages provided by the server 209 or employing a mobile client in the user's laptop/computer 255 that is capable of processing and displaying the second portion and accepting user inputs associated with it and communicating it back to the server 209.

In one embodiment, the mobile device 207 is a tablet capable of interacting with a TV in a room, and the downloadable educational mobile app 211 in the tablet is able to communicate its device capabilities to the server 209 to retrieve versions of content (such as educational material, tests, tutorials) that are appropriate to the device capabilities of the tablet. The server 209 maintains several different versions of content, and provides the appropriate version to the tablet, one that is compatible and provides a better user experience. In addition, the server 209 is capable of translating or transcoding content to better suit the device capabilities. For example, if the server 209 determines that it does not yet have a required version of a content that is more appropriate to the capabilities of the tablet 209, it retrieves a generic version of the same content and on-the-fly transcodes (changes it to make it more compaticle, as necessary) it to make it more compatible with the tablet 207, before delivering it to the tablet 207.

Figure 3:
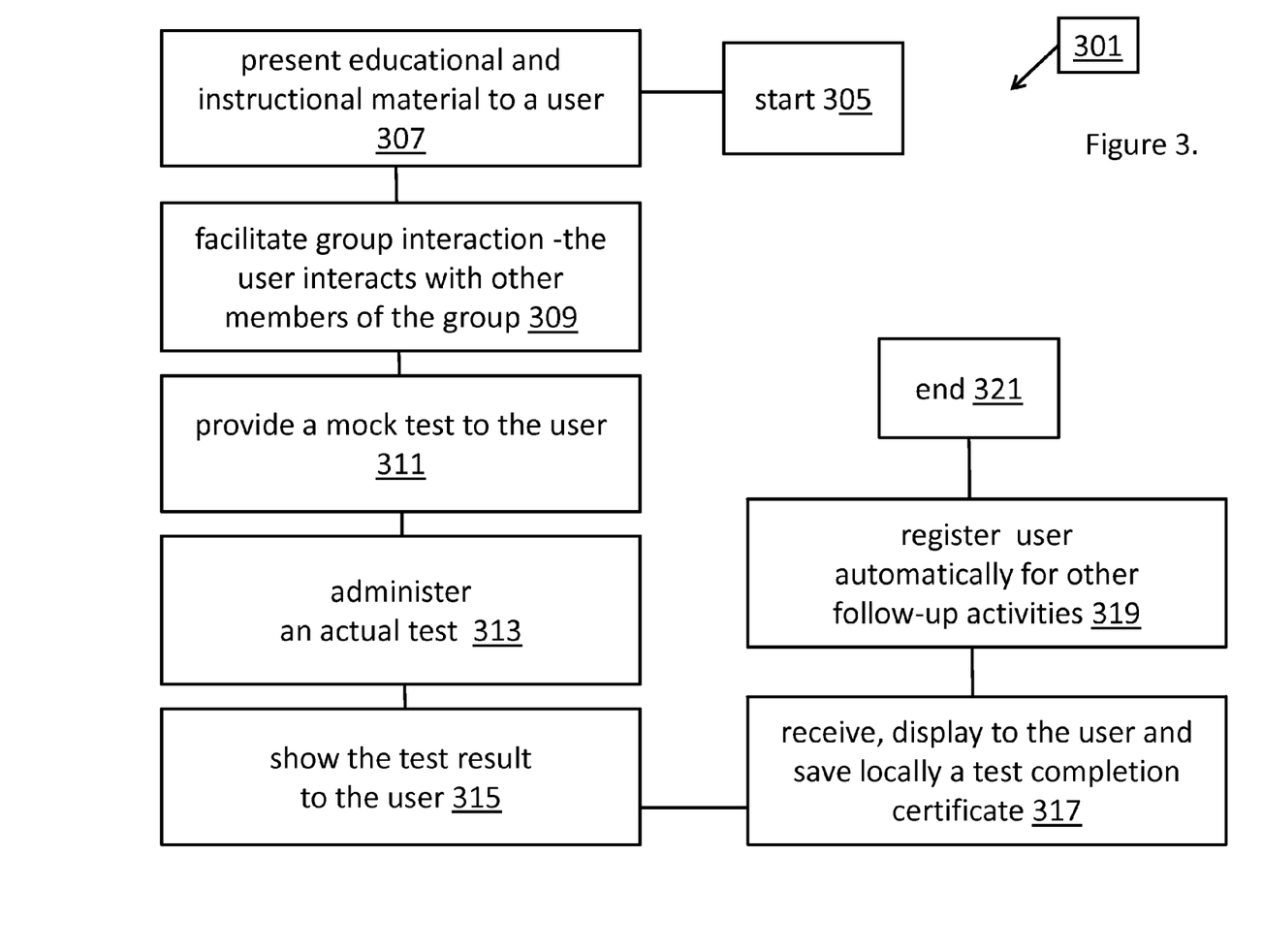
FIG. 3 is a flow chart of an exemplary operation of a system for mobile based learning and testing.

FIG. 3 is a flow chart 301 of an exemplary operation of a system for mobile based learning and testing. At a start block 305, the operation starts, when the user powers up his mobile device 107 and starts the downloadable educational mobile app 111, or when the server 109 determines it has to communicate a message to the user or send a document to the user. At a next block 307, the downloadable educational mobile app 111 presents educational and instructional material retrieved from the server 109 to a user, based at least on the user's membership in a group of users, the user's membership information being maintained by the server 109. Then, at a next step 309, the downloadable educational mobile app 111 facilitates group interaction, wherein the user interacts with other members of the group of users employing messages, wherein each message comprises one or more of a text message component, a recorded voice message, a digital image and an optional reference to a first test.

At a next block 311, the a downloadable educational mobile app 111 provides a mock test to the user, based at least on a user request or a user specific schedule. For example, the user may request a mock test to prepare for a standardized test. Alternately, the user may have a schedule assigned (by an adviser or as part of a program/coursework). At a next block 313, the downloadable educational mobile app 111 administers an actual test wherein the user of the mobile device 107 is presented with one or more screens of questions as part of that the test and the user provides inputs as prompted. Inputs can be in the form of text input, recorded audio, digital photo, streaming video, etc. The downloadable educational mobile app 111 in the mobile device 107 solicits answers to questions presented in the actual test, wherein the answers are collected as a test response and processed to generate a test result. In one embodiment, such processing occurs in the mobile device 107, and in another, the processing occurs at the server 109.

At a next block 315, the downloadable educational mobile app 111 shows the test result to the user, wherein the test results are generated based on the answers to the actual test administered to the user. Then, at a next block 317, the downloadable educational mobile app 111 receives, displays to the user and saves locally a test completion certificate, wherein the test completion certificate comprises a date, a reference to the actual test and the test result. Then, at a next block 319, the downloadable educational mobile app registers the user automatically with the server 109 for other follow-up activities based on at least the test result. Then, at a next end block 321, the processing terminates.

In one embodiment, the exemplary operation of the system for mobile based learning and testing further comprises the additional step of selecting, by the downloadable educational mobile app 111, at least one follow-up activity as a target set of activities for the user from the set of follow-up activities comprising result review and display, automatically scheduling a first follow-up test, automatically administering the first follow-up test, automatically delivering remedial study material, automatically mailing an appointment, automatically delivering ebooks, automatically delivering documents, articles and papers and automatically facilitating retaking of the test. The method also includes the step of executing, by the downloadable educational mobile app 111, the target set of activities for the user on the mobile device 107. The first follow-up test comprises one test from the set comprising a more advanced test, a less advanced test, a repeat test, a complimentary test, a comprehensive breadth coverage test, and a narrow expertise test. In a related embodiment, the exemplary operation also includes sending, to the downloadable educational mobile app 111 by the server 109, a preparatory material for the user, prior to conducting the actual test, wherein the preparatory material comprises references to at least one of a relevant document, a relevant book, a specific relevant section in a book, a study guide, a tutorial, a cheat sheet, an example problem with an associated answer to the problem. The preparatory material helps a user learn new concepts, practice lessons learnt, get better at answering questions and get better at time management. In fact, the downloadable educational mobile app 111 keeps track of time taken to complete a test, and warns the user on how much time is left when a test is taken, periodically all through the test.

In one embodiment, the downloadable educational mobile app 111 also executes the step of determining automatically, the remedial activities that is provided to the user. This determination is made based at least on the on the first test results, and often based also on the goals of the user, the type of tests the user is taking, the level of achievement on the test by the user, the schedule commitments of the user, and other user preferences.

In a related the downloadable educational mobile app 111 also sends receives a custom user material associated with the remedial activities. The server 109 sends the custom user material associated with the remedial activities after it retrieves it from a local storage/repository 133/database or from an external server 151 communicatively coupled to the mobile device or the server.

Figure 4:
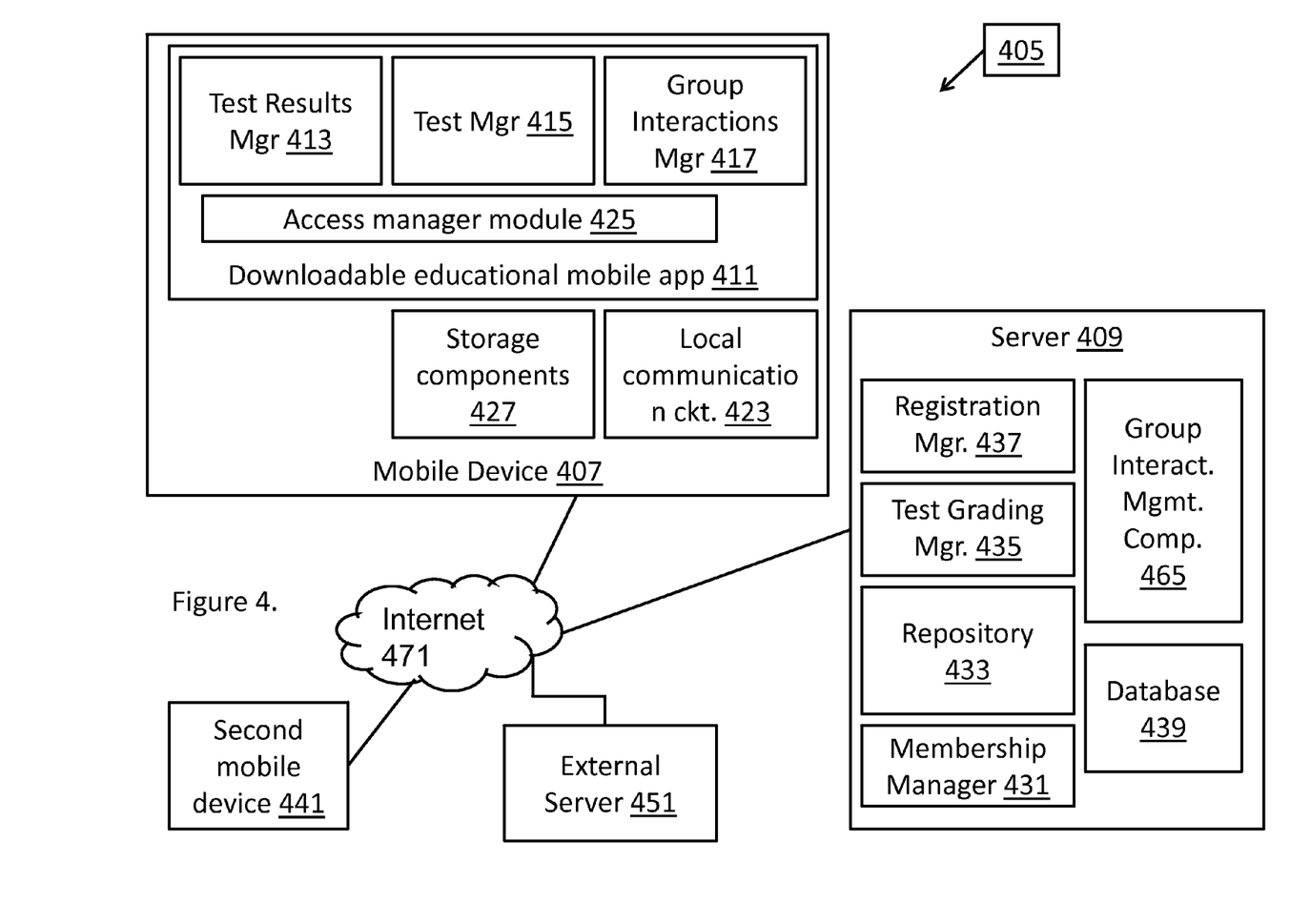
FIG. 4 is a perspective block diagram of a server for mobile learning and testing wherein the server comprises a repository for storing tests, coursework, educational and instructional material that can be retrieved from the server by a downloadable educational mobile app in a mobile device.

FIG. 4 is a perspective block diagram of a server 409 for mobile learning and testing wherein the server 409 comprises a repository 133 for storing tests, coursework, educational and instructional material that can be retrieved from the server 409 by a downloadable educational mobile app 411 in a mobile device 407. The server 409 also comprises a database 439 comprising at least one user group with membership information for a plurality of users who are members of the at least one user group and a group interaction management component 465 for managing user interactions over a plurality of mobile devices communicatively coupled with the server 409. The membership information is maintained by the server 409 in the database 439. The group interaction management component manages user interactions over a plurality of mobile devices communicatively coupled with the server 409 wherein each of the plurality of mobile devices 407, 441 employs a downloadable educational mobile app 411 for user interactions and for mobile learning and testing by an associated user.

The mobile device 407 comprises the downloadable educational mobile app 411, storage components 427 and a local communication circuitry 423. The functionality of the downloadable educational mobile app 411 is similar to the functionality of the downloadable educational mobile app 111 in FIG. 1. Its components test manager 415, test results manager 413, group interactions manager 417 and access manager module 425 comprise features similar to those described above for corresponding components in the system of FIG. 1.

The server 409 also comprise a registration manager 437 used to register users (such as students and teachers) in classes, tutorials, training sessions, tests and mock tests. The test grading manager 435 facilitates grading of tests and mock tests. It helps create test results from user's test response received. The membership manager 431 registers users to the educational and testing services provided by the for mobile learning and testing system 405, and to subscriptions for these educational and testing services. It also facilitates forming user groups and managing such user groups. It supports student groups, teacher groups, advisor groups, class groups, observers of groups, etc.

The server 409 employs the group interaction management component 465 to facilitate user interactions when a one of the plurality of users, employing a corresponding one of the plurality of mobile devices 407, 441 sends a message to one of more of the others of the plurality of mobile devices. The message comprises one or more of a text message component, a recorded voice message, a digital image and a reference to a first test, a course material, a schedule for a test and a test result. The server 409 provides a mock test to the downloadable educational mobile app 411 of one of the plurality of mobile devices 407 based at least on a user request from a corresponding one of the plurality of users or based on a user specific schedule for that user. The user can take the mock test more than once, and the server times the duration taken and the accuracy of the answers provided. The user can also take several different versions of the mock test for test taking practice. The server 409 also provides an actual test to the downloadable educational mobile app 411 of one of the plurality of mobile devices 407 based at least on a user request from the corresponding one of the plurality of users or based on a user specific schedule for that user.

The server 409 automatically computes a test result when it receives a user data for the actual test (or even a mock test in one related embodiment) from the downloadable educational mobile app 411 associated with the one of the plurality of mobile devices 407. The server 409 automatically communicates the test result to the downloadable educational mobile app 411 associated with the one of the plurality of mobile devices 407. The server 409 also automatically communicates a test completion certificate to the downloadable educational mobile app 411 associated with the one of the plurality of mobile devices, wherein the test completion certificate comprises a date, a reference to the actual test and the test result. In addition, the server 409 automatically registers that user for other follow-up activities based on at least the test result for a test taken by the user.

The server 409 selects at least one follow-up activity as a target set of activities for a user who has taken a test and created a test result. The target set of activities are selected from the set of follow-up activities comprising result review and display, automatically scheduling a first follow-up test, automatically administering the first follow-up test, automatically delivering remedial study material, automatically mailing an appointment, automatically delivering ebooks, automatically delivering documents, articles and papers and automatically facilitating retaking of the test. The server 409 communicates information regarding the target set of activities to the user via the downloadable educational mobile app 411.

The server of 409 sends a follow-up test to the user after receiving the user data for the actual test from the downloadable educational mobile app 411 associated with the one of the plurality of mobile devices 411. The follow-up test comprises one test from the set comprising a more advanced test, a less advanced test, a repeat test, a complimentary test, a comprehensive breadth coverage test, and a narrow expertise test.

The server 409 sends, to the downloadable educational mobile app 411 associated with the one of the plurality of mobile devices 407, a preparatory material to the corresponding user, prior to conducting the actual test by that user. The preparatory material comprises references to at least one of a relevant document, a relevant book, a specific relevant section in a book, a study guide, a tutorial, a cheat sheet, an example problem with an associated answer to the problem.

In one embodiment, the server 409 also determines automatically a remedial activities (a set of activities specifically for that user) that is provided to that user based on the first test results taken by the user. The server 409 sends a custom user material associated with the remedial activities wherein the server retrieves it from a local storage (repository 433 or database 439) or from an external server 451 communicatively coupled to the mobile device 407 or the server 411.

In one embodiment, the server 409 also comprises a billing module (not shown) that automatically charges a user (such as, for example, by means of a credit card associated with the user, or an account setup by the user) for test registrations, test administration charges, charges for delivering ebooks, study guides, preparatory materials, remedial materials, etc.

In one embodiment, the test (mock test or actual test) is provided to the downloadable educational mobile app 411 as an XML file and it comprises (for example) a welcome information and several questions (one question to be displayed per screen), each question requiring inputs from the user, and presenting user data input prompts. It also provides vendor information that a downloadable educational mobile app 411 can display selectively, such as when a user activates an "About" button (or menu item) provided in a first welcome page presented to the user by the downloadable educational mobile app 411. A section of the XML file provides a company name, description of the downloadable educational mobile app 411 that can process it and display it, a creation date, a type associated with the downloadable educational mobile app 411, an identification for the downloadable educational mobile app 411, and a use-case id for identifying a server-side logic/behavior to influence server 409 side processing.

In one embodiment, a section of the XML test document for each question specifies some particulars of a data input needs, and details of the question. It provides an audio preamble (link to an audio file stored at the server 409) that the downloadable educational mobile app 411 retrieves and plays when the corresponding screen is presented to the user. It also specifies a link/reference to an image that is displayed to the user in the same screen. In addition, a textual supplementary information (for clarifications to the current question, for example) and an audio supplementary information are also provided for each question in the test. Thus, each question in the XML file comprises information on display items such as a textual display component, an image display component, an audio recording/playback component, a table display component, a button display component, a map display component, a GPS coordinates display component and a screen navigation component for navigating between the plurality of questions (or associated screens). In addition, multiple choice selections are supported for each question (as necessary) that the downloadable educational mobile app 411 presents as a set of radio buttons to the user. The user selection can be INCLUSIVE or EXCLUSIVE. In addition, instead of radio buttons, a drop down box with multiple selection capabilities is employed for some embodiments.

As one of ordinary skill in the art will appreciate, the terms "user input components" and "UI form elements," as may be used herein, include all types of user input means typically used in dialog boxes and UI screens where data entry by a user is facilitated. The terms "mobile application" or "downloadable educational mobile app" includes downloadable java applications, J2ME based applications, iPhone mobile apps (that are coded in Object C), native mobile apps for Windows mobile (coded in C++ or other languages), mobile apps for Android platforms, etc. Although the invention is described in terms of downloadable educational mobile app, it must be clear that it can be easily applicable to pre-installed applications in devices, and to logic embedded in hardware chips (such as ASIC chips or DSP chips).

Although the tests are formatted as an XML document/file, other formats are contemplated, including a binary format, a zip format, etc.

Although the present invention has been described in terms of "mobile device", it must be clear that the present invention covers PDAs, cellular phones, VOIP phones, tablets such as iPAD, and other hand held devices such as iPOD, MP3 players, DVD players, TV remotes, etc.

Although the present invention has been described in terms of user data sent from mobile client to a server, where audio recorded on the mobile device and photo captured on the mobile device are communicated as part of the user data, it must be clear that the present invention also applies to other types of data that can be part of a user inputs provided by a user, such as text, video streams, charts, graphs, tables, html content, etc.

The present invention has also been described above with the aid of method steps illustrating the performance of specified functions and relationships thereof The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed, Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned, embodiments, the present invention is not limited to such embodiments. It will be obvious to one of average skill in the art that various changes and modifications may be practiced within the spirit and scope of the invention, as limited only by the scope of the appended claims.

What is claimed is:

1. A mobile device for mobile based learning and testing, the mobile device communicatively coupled to a server, the mobile device comprising:
   a downloadable educational mobile app capable of presenting educational and instructional material retrieved from the server, facilitating group interactions, providing a mock test, conducting an actual test and arranging automatic registration of a user of the mobile device based on a test result from the actual test;
   the downloadable educational mobile app presenting the educational and instructional material to the user based at least on the user's membership in a group of users, the user's membership information being maintained by the server;
   the downloadable educational mobile app facilitating group interaction by the user with other members of the group of users;
   the downloadable educational mobile app providing a mock test to the user based at least on a user request or a user specific schedule;
   the downloadable educational mobile app conducting an actual test and collecting a test response set from the user;
   the downloadable educational mobile app presenting a test result to the user, wherein the test result is provided based on the actual test taken by the user and the test response set;
   the downloadable educational mobile app receiving, displaying to the user and saving a test completion certificate that comprises a date, a reference to the actual test and the test result; and
   the downloadable educational mobile app automatically registering the user with the server for other follow-up activities based on at least the test result.

2. The mobile device of claim 1 further comprising:
   the downloadable educational mobile app of the mobile device facilitating user interaction with the follow-up activities, wherein the follow-up activities is one or more of the activities from the set comprising result review and display, automatically scheduling follow-up test, automatically administering a follow-up test, automatically delivering remedial study material, automatically mailing an appointment, automatically delivering ebooks, automatically delivering documents, articles and papers and automatically facilitating retaking of the test; and
   the downloadable educational mobile app of the mobile device conducting the follow-up test for the user, wherein the follow-up test is one test from the set comprising a more advanced test, a less advanced test, a repeat test, a complimentary test, a comprehensive breadth coverage test and a narrow expertise test.

3. The mobile device of claim 2 wherein the downloadable educational mobile app provides preparatory material to the user, prior to the actual test, wherein the preparatory material comprises references to at least one of a relevant document, a relevant book, a specific relevant section in a book, a study guide, a tutorial, a cheat sheet, an example problem with an associated answer to the problem.

4. The mobile device of claim 2 wherein the wherein the test result is computed by the server based on the test response set received from the downloadable educational mobile app, the mobile device further comprising:
   the downloadable educational mobile app provides a question with at least one image as part of the actual test;
   the downloadable educational mobile app facilitates the making of a mark on the at least one image by the user; and
   the downloadable educational mobile app processes the mark provided by the user and selectively communicates it to the server along with test response set provided by the user for the test, wherein the mark made by the user comprises a point selected by the user on the at least one image or a set of points selected by the user on the at least one image.

5. The mobile device of claim 2 further comprising:
   a local communication module to communicate with a local alternate user interaction device, wherein the local alternate user interaction device is one of a TV, a set-top-box, a router, a dock with display and keyboard and a personal computer;
   the downloadable educational mobile app causing the display of the interactive media on the local alternate user interaction device, wherein the interactive media is one or more of the mock test, the actual test; the test result and follow-up activities; and the downloadable educational mobile app collects, stores and communicates to the server an external device user inputs provided by the user employing the local alternate user interaction device.

6. The mobile device of claim 2 further comprising:

the downloadable educational mobile app administers a first test to a user, automatically processes a user data provided by the user in response to the first test to compute a first test results, automatically determines remedial activities that need to be provided to the user based on the first test results, and presents a custom user material associated with the remedial activities that is retrieved from the server or an external system communicatively coupled to the mobile device or the server; and the downloadable educational mobile app administers the remedial activities for the user on the mobile device wherein the remedial activities comprise undertaking a set of remedial online classes, viewing a tutorial session, reviewing a portion of an ebook for study, reading a personalized teaching material, working through workbook exercises, viewing a video demonstration, and taking a subsequent mock test.

7. The mobile device of claim 6 wherein the downloadable educational mobile app automatically highlights the relevant sections in at least one associated ebook where the user can find the relevant answers to at least one question included in the first test taken by the user, wherein the ebook is currently available in the mobile device or automatically delivered to the mobile device from the server based on the first test results.

8. The mobile device of claim 7 wherein the relevant sections correspond to a question in the first test that the user failed to answer adequately.

9. The mobile device of claim 2 further comprising:

the downloadable educational mobile app facilitates collection of a test response set from the user, wherein the test response set comprises user answers to a plurality of questions of the actual test, wherein the user answers is provided by the user in an recorded audio format, a textual data entry format, a digital image format or a combination of these formats; and the downloadable educational mobile app communicates the test response to the server for storage, automated analysis and the determination of follow-up activities.

10. The mobile device of claim 1 further comprising:

the downloadable educational mobile app in the mobile device facilitates conducting the actual test by displaying portions of the actual test on the mobile device while soliciting the test response set from the user, collecting the test response set from the user, and sending it to a second mobile device associated with a second user for grading;

the downloadable educational mobile app in the mobile device receives a test result from the second mobile device, based upon a grading operation executed by the second user on the second mobile device; and the downloadable educational mobile app in the mobile device presenting the test result received to the user.

11. A method for mobile based learning and testing, the method comprising:

presenting educational and instructional material retrieved from a server, by a downloadable educational mobile app, to a user based at least on the user's membership in a group of users, the user's membership information being maintained by the server;

facilitating group interaction, by the downloadable educational mobile app, wherein the user interacts with other members of the group of users employing messages, wherein each message comprises one or more of a text message component, a recorded voice message, a digital image and a reference to a first test;

providing a mock test to the user, by the downloadable educational mobile app based at least on a user request or a user specific schedule;

administering an actual test by the downloadable educational mobile app, wherein the downloadable educational mobile app in the mobile device solicits answers to questions presented in the actual test, wherein the answers are collected as a test response and processed to generate a test result;

showing the test result to the user by the downloadable educational mobile app, wherein the test results are generated based on the answers to the actual test administered to the user;

receiving, displaying to the user and saving a test completion certificate by the downloadable educational mobile app, wherein the test completion certificate comprises a date, a reference to the actual test and the test result; and registering the user automatically by the downloadable educational mobile app with the server for other follow-up activities based on at least the test result.

12. The method of claim 11 further comprising:

selecting at least one follow-up activity as a target set of activities for the user from the set of follow-up activities comprising result review and display, automatically scheduling a first follow-up test, automatically administering the first follow-up test, automatically delivering remedial study material, automatically mailing an appointment, automatically delivering ebooks, automatically delivering documents, articles and papers and automatically facilitating retaking of the test; and executing, by the downloadable educational mobile app, the target set of activities.

13. The method of claim 12 wherein the first follow-up test comprises one test from the set comprising a more advanced test, a less advanced test, a repeat test, a complimentary test, a comprehensive breadth coverage test, and a narrow expertise test.

14. The method of claim 11 further comprising:

sending, to the downloadable educational mobile app by the server, a preparatory material to the user, prior to conducting the actual test, wherein the preparatory material comprises references to at least one of a relevant document, a relevant book, a specific relevant section in a book, a study guide, a tutorial, a cheat sheet, an example problem with an associated answer to the problem.

15. The method of claim 11 further comprising:

determining automatically, a remedial activities that is provided to the user based on the first test results; and sending, by the server, a custom user material associated with the remedial activities wherein the server retrieves it from a local storage or from an external system communicatively coupled to the mobile device or the server.

16. A server for mobile learning and testing, the server comprising:

a repository for storing tests, coursework, educational and instructional material that can be retrieved from the server by a downloadable educational mobile app;

a database comprising at least one user group with membership information for a plurality of users who are members of the at least one user group, the membership information being maintained by the server in the database;

a group interaction management component for managing user interactions over a plurality of mobile devices communicatively coupled with the server wherein each of the plurality of mobile devices employs a downloadable educational mobile app for user interactions and for mobile learning and testing by one of a plurality of users;

the server employing the group interaction management component to facilitate user interactions when one of the plurality of users, employing a corresponding one of the plurality of mobile devices, sends a message to one of more of the others of the plurality of mobile devices, wherein the message comprises one or more of a text message component, a recorded voice message, a digital image and a reference to a first test, a course material, a schedule for a test and a test result;

the server providing a mock test to the downloadable educational mobile app of one of the plurality of mobile devices based at least on a user request from a corresponding one of the plurality of users or a user specific schedule for that user; and the server providing an actual test to the downloadable educational mobile app of one of the plurality of mobile devices based at least on a user request from the corresponding one of the plurality of users or a user specific schedule for that user.

17. The server of claim 16 further comprising:

the server automatically computing a test result when it receives a user data for the actual test from the downloadable educational mobile app associated with the one of the plurality of mobile devices;

the server automatically communicating the test result to the downloadable educational mobile app associated with the one of the plurality of mobile devices; and the server automatically communicating a test completion certificate to the downloadable educational mobile app associated with the one of the plurality of mobile devices, wherein the test completion certificate comprises a date, a reference to the actual test and the test result; and the server automatically registering that user for other follow-up activities based on at least the test result.

18. The server of claim 17 further comprising:

the server selecting at least one follow-up activity as a target set of activities for that user from the set of follow-up activities comprising result review and display, automatically scheduling a first follow-up test, automatically administering the first follow-up test, automatically delivering remedial study material, automatically mailing an appointment, automatically delivering ebooks, automatically delivering documents, articles and papers and automatically facilitating retaking of the test; and the server communicating information regarding the target set of activities.

19. The server of claim 16 wherein the server sends a follow-up test to the user after receiving the user data for the actual test from the downloadable educational mobile app associated with the one of the plurality of mobile devices, wherein the follow-up test comprises one test from the set comprising a more advanced test, a less advanced test, a repeat test, a complimentary test, a comprehensive breadth coverage test, and a narrow expertise test.

20. The method of claim 16 further comprising:

the server sending, to the downloadable educational mobile app associated with the one of the plurality of mobile devices a preparatory material to the corresponding user, prior to conducting the actual test by that user, wherein the preparatory material comprises references to at least one of a relevant document, a relevant book, a specific relevant section in a book, a study guide, a tutorial, a cheat sheet, an example problem with an associated answer to the problem;

the server determining automatically, a remedial activities that is provided to that user based on the first test results; and the server sending, a custom user material associated with the remedial activities wherein the server retrieves it from a local storage or from an external system communicatively coupled to the mobile device or the server.

\* \* \* \* \*